(No Model.)

J. CLAYTON.
WHEEL PLOW.

No. 484,652. Patented Oct. 18, 1892.

Witnesses
Jesse Heller
Phill Ullasi

Inventor
John Clayton
by E.W. Anderson
his Attorney (No Model.) 5 Sheets—Sheet 2.

J. CLAYTON.
WHEEL PLOW.

No. 484,652. Patented Oct. 18, 1892.

Witnesses
Jesse Heller
Phil A. Masi

Inventor
John Clayton
by E. W. Anderson
his Attorney (No Model.) 5 Sheets—Sheet 3.
J. CLAYTON.
WHEEL PLOW.
No. 484,652. Patented Oct. 18, 1892.
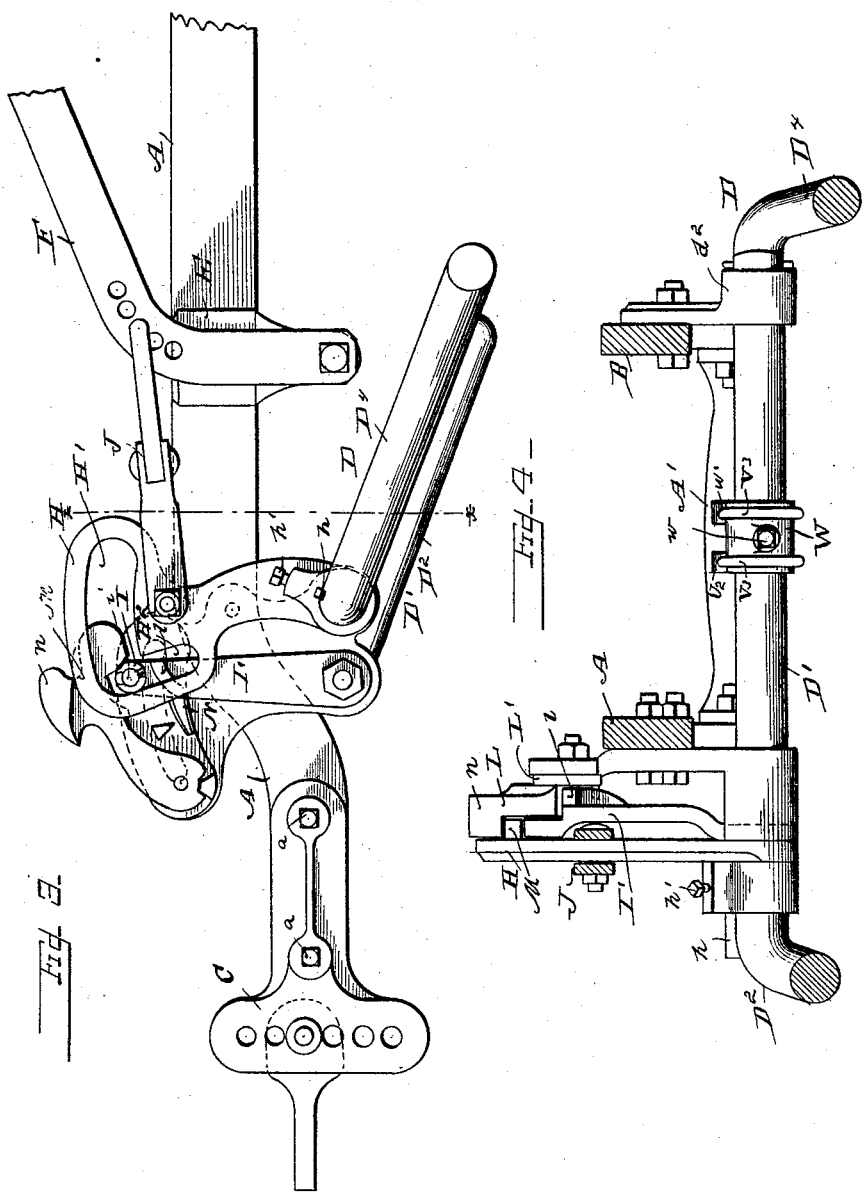
Witnesses
Jesse Heller
Phil C. Masi
Inventor
John Clayton.
by E.W. Anderson
his Attorney
THE NORRIS PETERS CO., PHOTO-LITHO., WASHINGTON, D. C.

(No Model.) 5 Sheets—Sheet 4.
J. CLAYTON.
WHEEL PLOW.
No. 484,652. Patented Oct. 18, 1892.
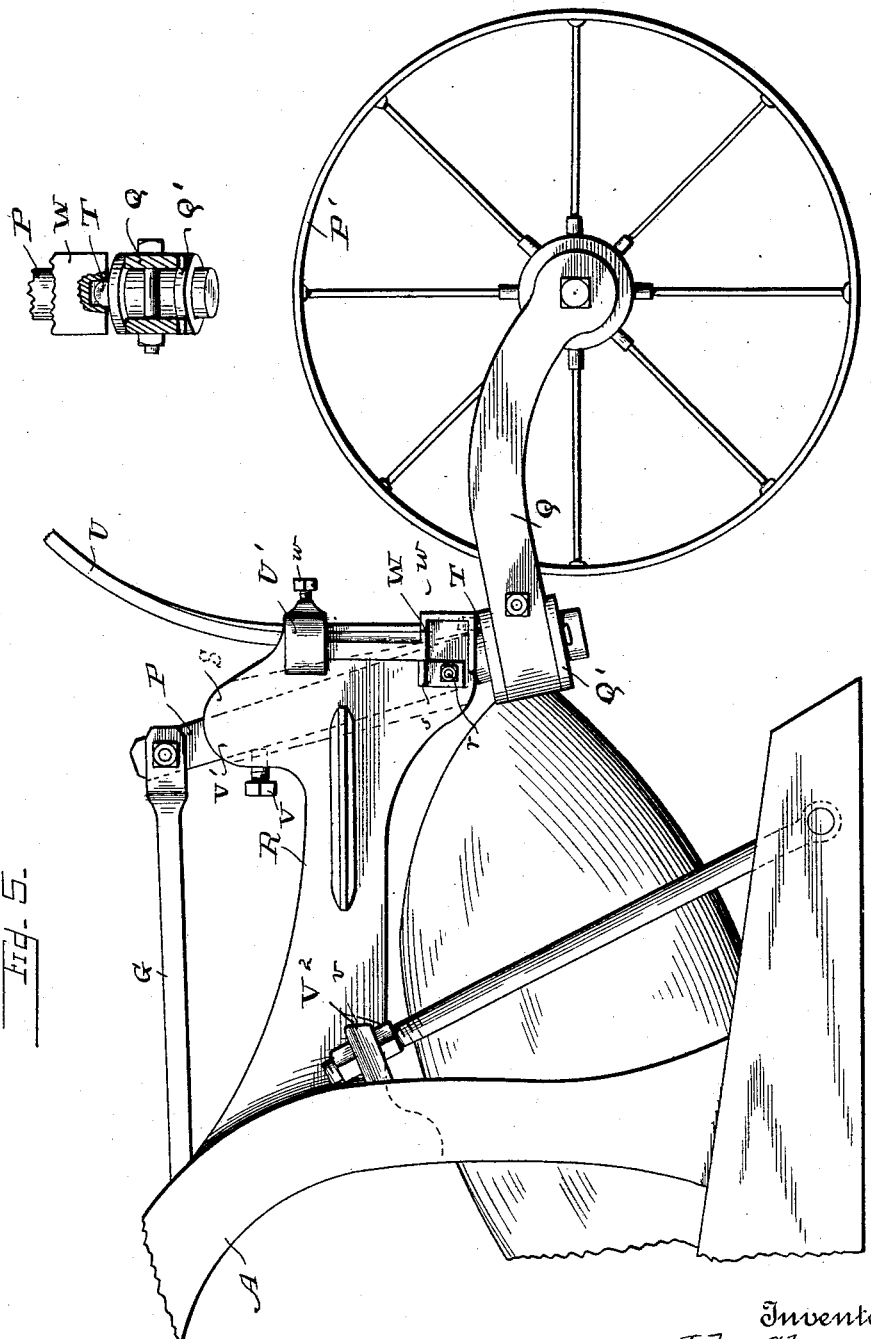
Witnesses
Jesse Heller
Phil O. Masi
Inventor
John Clayton
by E. W. Anderson
his Attorney (No Model.) 5 Sheets—Sheet 5.
J. CLAYTON.
WHEEL PLOW.
No. 484,652. Patented Oct. 18, 1892.
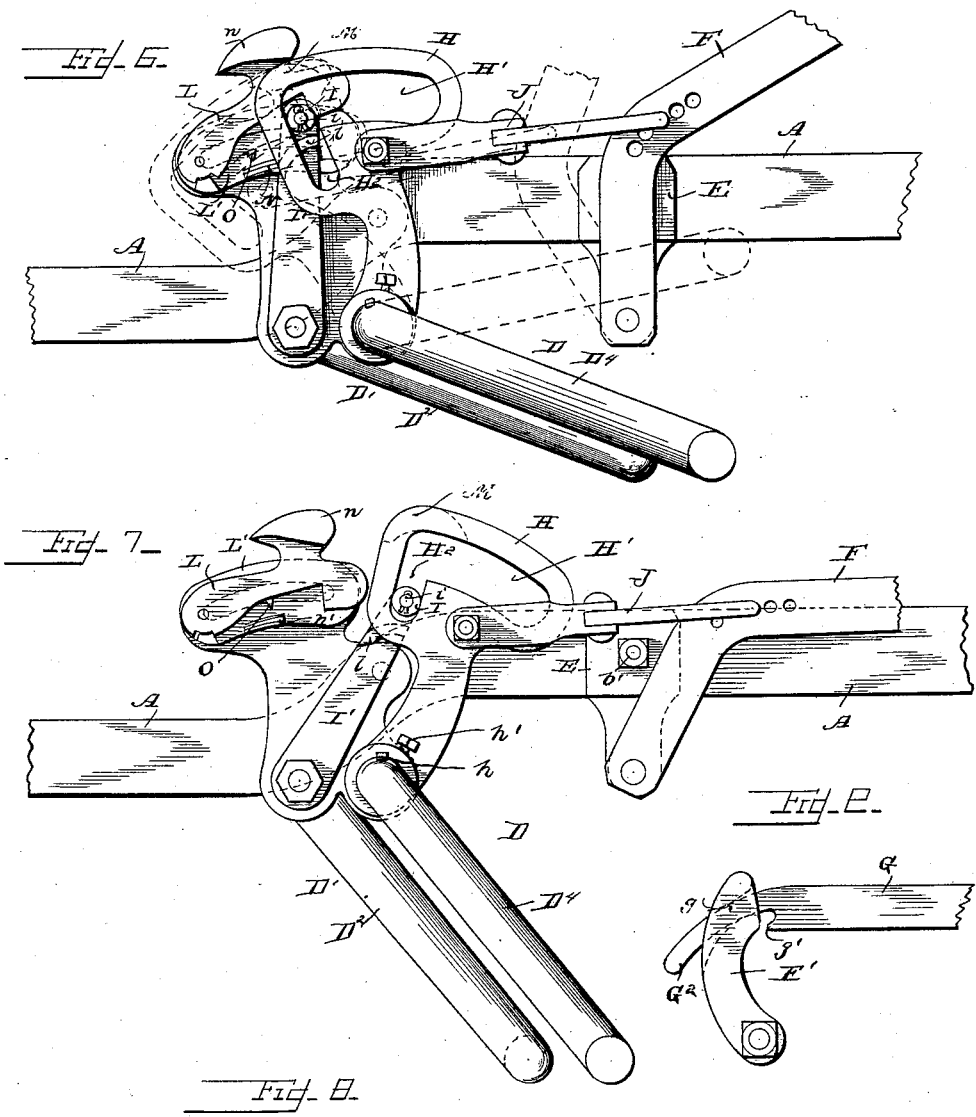
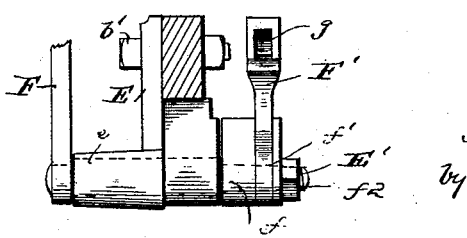
Witnesses
Jesse Helber
Phil O. Masi.
Inventor
John Clayton
by E. W. Anderson
his Attorney

UNITED STATES PATENT OFFICE.

JOHN CLAYTON, OF MINNEAPOLIS, MINNESOTA.

WHEEL-PLOW.

SPECIFICATION forming part of Letters Patent No. 484,652, dated October 18, 1892.

Application filed December 31, 1891. Serial No. 416,623. (No model.)

*To all whom it may concern:*

Be it known that I, JOHN CLAYTON, a citizen of the United States, and a resident of Minneapolis, in the county of Hennepin and State of Minnesota, have invented certain new and useful Improvements in Wheel-Plows; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
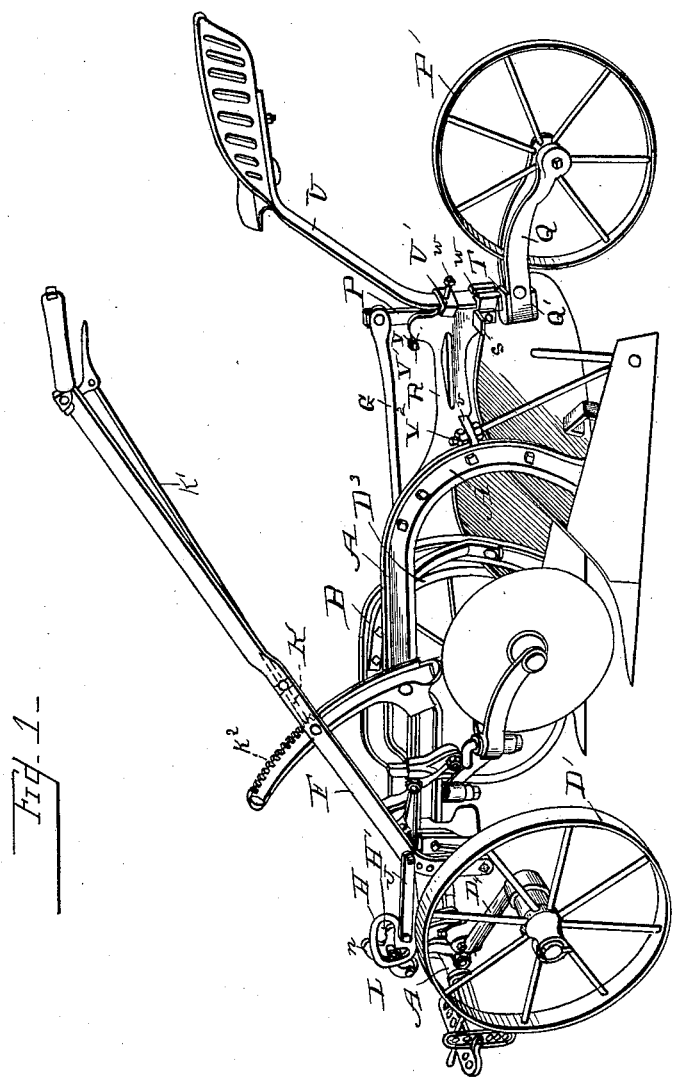
Figure 2:
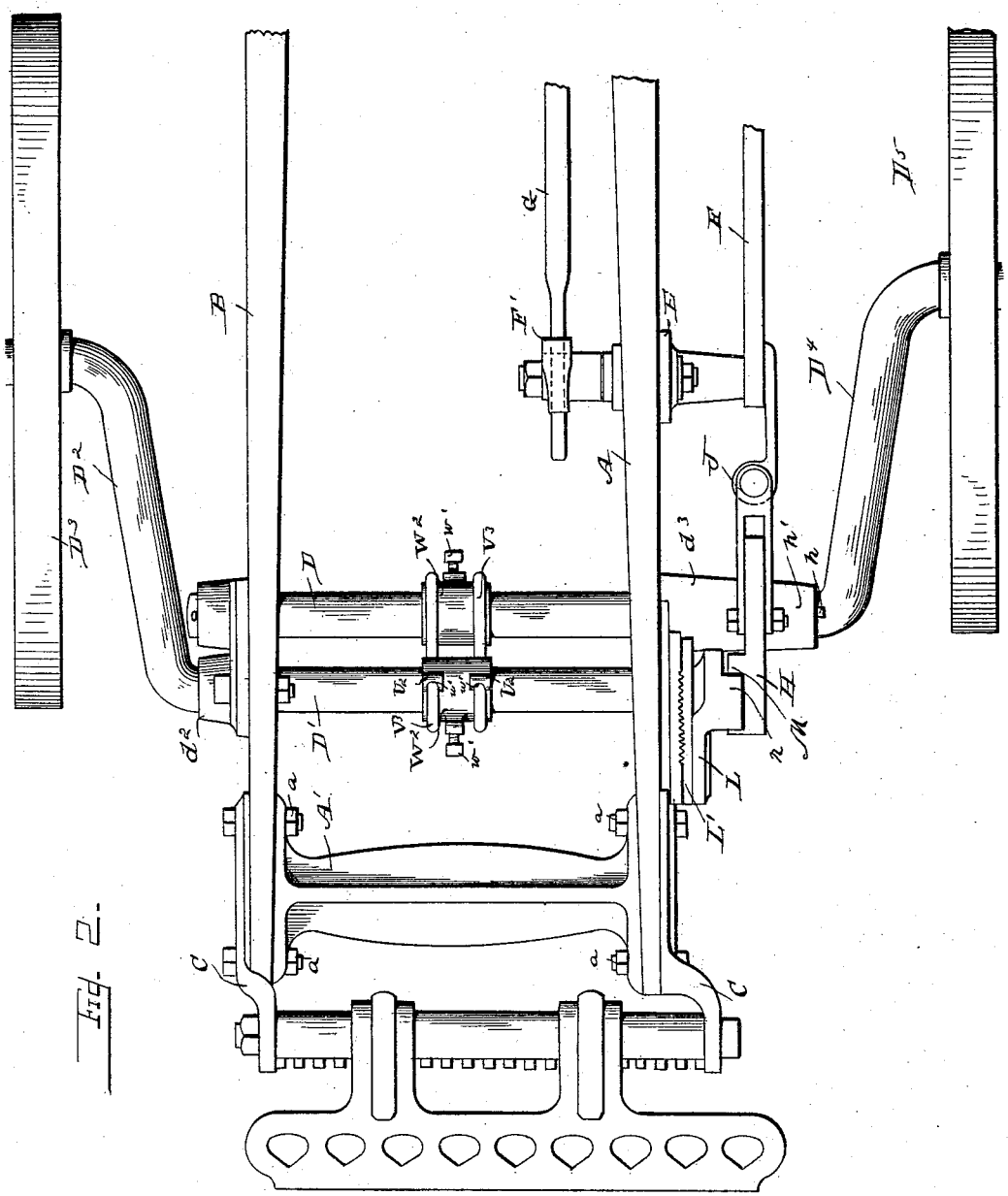

Figure 1 is a perspective view showing the entire plow, looking from the landside. Fig. 2 is an enlarged plan of the front portion of the plow. Fig. 3 is a side elevation of the same. Fig. 4 is a transverse vertical section on the line $x$ $x$, Fig. 3. Fig. 5 is a side elevation of the rear portion of the plow. Fig. 6 is a detail of the forward portion of the plow, showing in full lines the positions of the parts when the plows are leveled up and in dotted lines the positions when the plows are out of the ground. Fig. 7 is a similar view showing the positions of the parts when the plows are in the ground to their full depth. Fig. 8 is a detail showing the manner of connecting the operating-lever, and Fig. 9 is a detail showing the connection between the connecting-rod to the rear wheel and its operating mechanism.

This invention has relation to certain new and useful improvements in wheel-plows; and it consists in the novel construction and combination of parts, as hereinafter described, and pointed out in the claims.

In the accompanying drawings, the letters A and B designate, respectively, the land and furrow beams, connected near their forward ends by the curved rectangular ribbed brace A', secured thereto by bolts $a$ $a$, which also serve to secure the side clevises C C to said beams. Depending from the land-beam A to the rear of the land and furrow wheel axle-arms D and D' and secured to said beam by a bolt $b$ is a bracket-bearing E, having a horizontal cylindrical aperture or bearing $e$ through its lower portion. Bearing in this aperature $e$ is a rod E', to the outer end of which is secured the operating-lever F.

F' designates an arm having an angular tapered aperture $f$ in its lower end, which is engaged by a correspondingly-shaped portion $f'$ on the inner end of the rod E' and is secured on said rod by a nut $f^2$. In the upper end of the arm F' is an aperture $g$, in which rests the rectangular end of a link-rod G, passing therethrough sufficiently far, as shown at $G^2$, to prevent it from falling out when the lever F is raised to the limit of its movement. The opposite end of this rod or link is connected to the hanger P of the rear wheel P' for the purpose hereinafter described.

When the lever F is raised, it carries with it, as will be seen, the arm F'. When said lever is depressed, a shoulder $g'$ on the under side of the rod G is engaged by the arm F' and forces said rod rearwardly, together with the hanger P, depressing the rear wheel P' and elevating the rear ends of the plows above the level of the ground for facilitating turning corners, &c.

The furrow-wheel axle-arm D' is provided with loose bearings $d^2$, depending from and secured to the furrow-beam, and has a rearwardly-projecting arm $D^2$, on which is journaled the furrow-wheel $D^3$. The land-wheel axle-arm D has similar bearings on a casting $d^3$, secured to the beam A, and has an arm $D^4$, on which is journaled the land-wheel $D^5$.

H designates an arm on what I preferably term a "cam-link," which is secured at its lower portion to the land-wheel axle-arm by a key $h$ and set-screws $h'$. The upper part or head of this link is cut out, as shown, to form a cam-edged aperture H', in which travels a roller I, journaled on a pin or stud $i$ of an arm I', secured to the axle-arm D' of the furrow-wheel. The link H is connected to the lever F by means of a hinged link J, adjustably connected to said lever. Consequently when the lever F is depressed it carries with it the link H, and thereby brings the land-wheel to a level with the furrow-wheel. When this level is reached, the lever F being still further depressed, the roller I is engaged by an arm $H^2$ of the cam-slot H', and when the lever is at the limit of its movement said arm is engaged by the bottom wall of said slot and both land and furrow wheels are depressed to raise both plows out of the ground. When, however, said lever is thrown to the other limit of its movement, the roller I clears the arm H² of the slot H' and the link is carried forward until said roller rests against the opposite wall of the slot H'. In this position the axle-arms will be raised, setting the plows to their full depth in the ground. This construction secures the independent action of the arm carrying the land-wheel in raising and lowering said wheel to vary the depth of the furrow without changing the position of the furrow-wheel, which will remain, while the plow is at work, level with the bottom of the plowshares until the land-wheel by the depression of the lever is brought to a level with the furrow-wheel. Continuing the depression of the lever by the action of the cam-slot and roller, the arms of both wheels are caused to take bearings on the wheels and the plows are lifted clear of the ground. By means of the connection G to the rear wheel-hanger the rear portions of the plows are elevated at the same time by the same operation. The lever is held to the proper adjustment by a pawl K and pawl-lever K' thereon, said pawl engaging any one of a series of teeth on the segment arm or rack K², projecting upwardly from the land-beam.

To hold the arm I' to its position when the plows are in the ground to their full depth, I provide the dog L. This dog is pivoted to a dog-plate L', carried by an arm or projection of the bearing $d^3$ for the land-axle. When the plows are their full depth in the ground the dog L drops on an inward projection $l$ on the arm I' and secures said arm in position. When the lever is depressed, a projection M on the back of the link H comes in contact with a stud projection $n$ on the dog, lifting it from engagement with $l$ on the arm I', permitting said arm to be actuated by the engagement of the cam-slot with its roller to level up the furrow-wheel. The dog when down rests on a projection O on the dog-plate. A projection N on said plate serves as a stop for the arm I' when the plows are leveled up.

The rear wheel P' is hung in a yoke Q, the arms of which are clamped at their forward portions to a bearing-block Q' on the lower portion of the hanger P. This hanger P is carried in a bracket-arm R of the plow-beam A, which has a vertical slot or chamber S therein, through which said hanger passes. Said hanger is pivoted at $r$ in the walls of said chamber, the pivot-bolt therefor serving, also, to secure the foot-rests $s$ to the bracket-arm. The chamber or slot S is of sufficient size to allow the hanger to oscillate therein on its pivot. It will therefore be apparent that when the lever F is depressed the hanger P is moved on its pivot to cause the wheel P' to take a bearing on the ground to elevate the rear portions of the plows. When the lever is raised, the hanger is moved reversely to elevate the wheel and permit the plows to enter the ground.

On the bearing-block Q' is a stud or projection T, which when the plows are lifted out of the ground is carried downward, swinging clear of the bracket R. When, however, the plows are in the ground, said stud or projection is thrown upward into engagement with a slot of the bracket. When in the former position, the rear wheel P' has a swivel movement on the hanger; but when in the latter it will be held rigid, thus rendering said wheel a caster-wheel when the plows are out of the ground and a set wheel when they are in the ground. The projection T is usually of rounded form, the corners of the socket or slot in the bracket being similarly rounded. This construction is provided in order that when turning a square-corner furrow without lifting the plows from the ground the lateral strain brought on the rear wheel by the team in pulling the plow sidewise to get in line with the furrow at right angles to the one finished may cause said projection to ride out of the socket or slot, falling again into place when the plow gets into line with the new furrow. This serves to keep the rear wheel sufficiently rigid to track in line and steady the plows when at work, but allows it lateral movement when any great strain is brought upon it, as in turning a square corner with the plows in the ground, as above stated.

U designates the seat-spring, which is adjustably held to the bracket-arm R by the clamp U', consisting of the apertured lugs W, through which said spring passes, and the binding-screws $w$, having bearings in said lugs.

The rear wheel P' is leveled up by means of the set-screw V, which has bearings in an upper projection V' of the bracket-arm R and engages the hanger P to regulate its normal position in said bracket and the consequent adjustment of the wheel.

V² is a bolt for leveling up the plow-points, said bolt being connected to the landside of the plow and having a threaded engagement with a lug $v$ on the plow-beam.

The dog-plate L' is held to the arm or projection of the bearing $d^3$ by means of a bolt passing through an arc-shaped slot in said dog-plate. By moving said plate forwardly or rearwardly on said bolt it will change the position of the arm I', which will carry with it the arm carrying the furrow-wheel, enabling the operator to set the furrow-wheel on a level with the bottom of the plowshare or above or below, as may be desired, or to perform what is known as "leveling up."

To assist in operating the plows by the lever F, the axle-arms D D' between the two beams are each provided with a collar W', held thereto by a set-screw $w'$. Each collar has a projection U², in which are formed seats or pockets $u'$.

V³ are curved springs, each having one of its ends seated against the rear wall of the pocket of one collar and its other end against the rear walls of the pocket of the other collar. The tension put upon the springs by the upward movement of the lever F assists in lifting the plows out of the ground in its downward movement. When the lever has reached the extreme limit of its downward movement, the springs are at rest and the plows are out of the ground. The rear walls of the pockets, against which the ends of the springs bear, resist the thrust of the springs when put under tension by the upward movement of the lever. One or more springs may be employed.

Having described this invention, what I claim as new, and desire to secure by Letters Patent, is—

1. In a wheel-plow, the combination, with the land-beam and the bracket secured thereto, of the rod having bearings in said bracket, an operating-lever connected to one end of said rod, a connection between said rod and the rear wheel, and means for operating the land and furrow wheel axles connected to said lever, the parts being so arranged that the operation of said lever will simultaneously raise or depress said rear wheel and the land and furrow wheels, substantially as specified.

2. The combination, with the land-beam having the bracket secured thereto, of the operating-lever connected to a rod having bearings in said bracket, an arm secured to said rod, and a rod or link resting loosely in an aperture in said arm and provided with a shoulder adapted to engage said arm, said rod or link being connected to the oscillating hanger carrying the rear wheel, substantially as specified.

3. The combination, with the operating-lever and with the axle-arm of the land-wheel, of the link or arm secured to said axle-arm and having a cam slot or aperture therein, a connection between said link or arm and the operating-lever, and an arm secured to the axle-arm of the furrow-wheel and carrying a roller actuated by said cam-slot, substantially as specified.

4. The combination, with the axle-arm, of the land-wheel shaft and its bearings, the link or arm secured to said shaft and having a cam-slot therein, and the arm secured to the axle-arm of the furrow-wheel, and the operating-lever and its link connection with said link, substantially as specified.

5. The combination, with the axles of the land and furrow wheels loosely hung in bearings secured to the land and furrow beams and provided each with the rearwardly-turned arm, on which land and furrow wheels are respectively journaled, of the arm or link secured to said land-wheel axle and having a cam-edged slot therein, an arm secured to said furrow-wheel axle and carrying a wheel or roller at its upper portion, adapted to be engaged by said slot to operate said arm, and thereby the furrow-wheel axle, and the operating-lever connected to said cam-link, substantially as specified.

6. The combination, with the axles of the land and furrow wheels loosely hung in bearings secured to the beams and provided each with a rearwardly-turned arm, on which are journaled, respectively, the land and furrow wheels, of the arm or link secured to the axle of said land-wheel and having a cam-edged slot therein, an arm secured to the furrow-wheel axle and carrying a roller engaged by the said cam-slot, an operating-lever connected by links to the cam-arm, and a connection between said operating-lever and the hanger of the rear wheel, whereby the depression of the said lever will depress said wheel simultaneously with the movement of the land and furrow wheels through said lever and said cam-links and arm, substantially as specified.

7. The combination, with the link or arm connected to the land-wheel axle and having the cam-slot therein, the arm connected to the furrow-wheel axle and carrying the roller engaged by said slot, and the operating-lever connected to said link, of the pivoted dog and dog-plate adapted to lock said arm in its positions, substantially as specified.

8. The combination, with the link or arm connected to the land-wheel axle and having a cam-slot at its upper portion, the arm connected to the furrow-wheel axle and carrying a roller or wheel engaged by said slot, and the operating-lever connected to said link, of the dog-plate carried by an arm of the land-wheel-axle bearing, and the dog pivoted to said plate, said dog and plate being provided with means for holding said arm in the position to which it is thrown by the movement of said link, and means on said link for releasing said dog, substantially as specified.

9. The combination, with the cam link or arm and the cam carrying the wheel or roller engaged by the cam-slot of said link, of the adjustable dog-plate, the dog pivoted thereto, the projections on said plate for holding said dog and for serving as stops for said arm, and a projection on said arm adapted to be engaged by said dog, and means on said link for releasing said dog, substantially as specified.

10. The combination, with the mechanism for leveling up the land and furrow wheels and the operating-lever for said mechanism, of the arm connected to the pivot-rod of said lever and the rod or link having a loose connection with said arm and connected with the hanger of the rear wheel, whereby the latter will be operated simultaneously with the land and furrow wheels, substantially as specified.

11. The combination, with the rear wheel carried by an oscillating hanger, and a connection between said hanger and the operating-lever, of the means for operating the land and furrow wheel axles also connected with said lever, whereby the operation of said lever will simultaneously raise or depress said rear wheel and the land and furrow wheels, substantially as specified.

12. The combination, with the hanger pivotally secured in a bracket-arm of the plow-beam, a bearing-block fast on said hanger, and the rear wheel bearing in a yoke connected to said bearing-block, a connection between said hanger and the operating-lever for the land and furrow wheel axles, whereby the operation of said lever will simultaneously raise or depress said rear wheel and the land and furrow wheels, substantially as specified.

13. In a plow, the combination, with the bracket-arm of the plow-beam, provided with a vertical slot or chamber therein, of a hanger pivoted and oscillating in said chamber, a bearing-block fast on the lower portion of said hanger, the yoke connected to said block and carrying the rear wheel, the stud or projection on said block adapted to swing into and out of engagement with a slot or socket in the bracket-arm, the corners of said slot or socket and of said stud being rounded, and means for effecting the vertical adjustment of said hanger, substantially as specified.

14. In a plow, the combination, with a bracket-arm of the plow-beam, having a rounded socket or seat therein, of a hanger pivoted in said arm, said hanger having a bearing-block fast on its lower portion, to which the yoke for the rear wheel is connected, and a stud or projection on said block adapted to swing into and out of connection with the rounded socket in said bracket-arm when said hanger is oscillated and under excess of lateral strain on the rear wheel, substantially as specified.

15. The combination, with the land and furrow beams, the operating-lever, and its connections, of the axle-arms on which the land and furrow wheels are journaled, said arms having loose bearings on said beams and having thereon collars, and springs connecting the two axles and seated in said collars, substantially as specified.

In testimony whereof I affix my signature in presence of two witnesses.

JOHN CLAYTON.

Witnesses:
G. L. FORT,
W. A. TOWNE.